US008297847B2

(12) United States Patent
Niklewski et al.

(10) Patent No.: US 8,297,847 B2

(45) Date of Patent: Oct. 30, 2012

(54) BEARING ARRANGEMENT FOR A ROLLER CRUSHER

(75) Inventors: Andrzej Niklewski, Alto de Pinheiros (BR); Paulo Barscevicius, Sorocaba (BR)

(73) Assignee: Metso Brasil Industria E Comercio Ltda, Sorocaba SP (BR)

( * ) Notice: Subject to any disclaimer, the term of this patent is extended or adjusted under 35 U.S.C. 154(b) by 73 days.

(21) Appl. No.: 13/001,693

(22) PCT Filed: Jun. 30, 2009

(86) PCT No.: PCT/IB2009/006121

§ 371 (c)(1), (2), (4) Date: Dec. 28, 2010

(87) PCT Pub. No.: WO2010/001225

PCT Pub. Date: Jan. 7, 2010

(65) Prior Publication Data

US 2011/0097026 A1 Apr. 28, 2011

Related U.S. Application Data

(60) Provisional application No. 61/076,895, filed on Jun. 30, 2008.

(30) Foreign Application Priority Data

Jun. 30, 2008 (SE) ...................................... 0801544

(51) Int. Cl.
*F16C 35/06* (2006.01)

(52) U.S. Cl. ......................... 384/432; 384/428; 384/440

(58) Field of Classification Search .................. 384/428, 384/432, 440, 445, 548–549, 586–587, 597, 384/618–619; 241/101.2, 117, 204, 207, 241/287, 216, 292

See application file for complete search history.

(56) References Cited

U.S. PATENT DOCUMENTS

| | | | | | |
|---|---|---|---|---|---|
| 3,229,922 | A | * | 1/1966 | Weiss et al. | 241/204 |
| 4,168,806 | A | | 9/1979 | Jakobs | |
| 4,512,525 | A | * | 4/1985 | Cameron | 241/207 |
| 4,582,267 | A | * | 4/1986 | Kohler | 241/214 |
| 4,989,795 | A | * | 2/1991 | de Lackner | 241/117 |
| 5,005,775 | A | | 4/1991 | Jakobs | |
| 5,524,839 | A | * | 6/1996 | Schade et al. | 241/187 |
| 5,775,607 | A | * | 7/1998 | Bayliss et al. | 241/207 |
| 5,938,133 | A | * | 8/1999 | Bayliss et al. | 241/214 |

FOREIGN PATENT DOCUMENTS

| | | | | |
|---|---|---|---|---|
| DE | 43 01 589 | A1 | | 7/1994 |
| DE | 102006037774 | A1 | * | 2/2008 |
| FR | 2574314 | A | * | 6/1986 |
| FR | 2574314 | A1 | * | 6/1986 |

OTHER PUBLICATIONS

International Search Report: PCT/IB2009/006121.

* cited by examiner

*Primary Examiner* — Marcus Charles

(74) *Attorney, Agent, or Firm* — Ladas & Parry LLP

(57) ABSTRACT

A bearing arrangement for a roller crusher having a pair of crushing rollers (R), each one including a shaft having end portions, mounted in respective bearing housings carried on a base structure (S) of the crusher, and a median hub portion. The bearing housings of each roller (R) are affixed to a structural frame disposed externally to each roller (R), along one side of the respective roller (R), the structural frame maintaining the bearing housings of each roller (R) rigidly connected to each other. Each bearing housing includes: a base portion affixed to the structural frame and a cover portion turned to the other roller (R) and removably affixed to the base portion.

9 Claims, 5 Drawing Sheets

BEARING ARRANGEMENT FOR A ROLLER CRUSHER

CROSS REFERENCE TO RELATED APPLICATIONS

This is a 371 Application of PCT application. PCT/IB2009/006121, filed on Jun. 30, 2009, which is a non-provisional application taking priority from Ser. No. 61/076,895 filed on Jun. 30, 2008. The entire declaration, oath, specification, disclosure, and drawing figures, and each of them, from said parent patent application are hereby incorporated herein by reference, thereto.

FIELD OF THE INVENTION

The present invention refers to a bearing arrangement to be applied to the rollers of a crusher of the type which utilizes a pair of crushing rollers, parallel to one another and designed to rotate in opposite directions, so as to allow the passage, therebetween, of the material to be crushed to a desired reduced size, the material being generally defined by mineral coal, rock, gravel, etc.

In these equipment, each of the crushing rollers has a shaft having opposite end portions, which are mounted in bearings carried by a base structure of the equipment, and a median hub portion, around which is mounted, for example by interference, a crusher shell in the form of a tubular sleeve formed in an adequate material to withstand the high work pressures applied to the crushing shell during the crushing operations.

BACKGROUND OF THE INVENTION

According to one known construction, the roller crusher of the type mentioned can be formed with a fixed roller, having its end portions mounted in respective bearings which are lodged in surrounding bearing housings removably attached to a base structure of the equipment. The other roller of the crusher has its end portions also mounted in respective bearings lodged in surrounding bearing housings. However, in this other roller, the two bearing housings are mounted to the base structure of the equipment, so as to allow the other roller, known as moving roller, to be angularly or linearly displaced to and from the fixed roller, permitting not only the adjustment of the operational spacing between the two rollers and the consequent compensation of the wear degree of the two crushing surfaces, but also the displacement of the moving roller to an inoperative dismounting position, spaced apart from the fixed roller.

In another known construction, the roller crusher can have the bearing housings of both rollers mounted to the base structure of the equipment, so as to allow the two rollers to be displaced to and from each other. This type of mounting is being offered to the market by KHD Humbolt Wedag AG.

In these known high pressure crushers, the periodic replacement of the worn out crushing surfaces requires, even with the moving roller or rollers being displaced to an inoperative position, spaced from the other roller, the shafts to be dismounted in relation to the respective end bearings attached in the interior of their bearing housings, which have the form of a surrounding body removably attached to the base structure of the equipment. This dismounting operation is difficult to execute at the installation place of the equipment, in most cases requiring the whole assembly formed by the shaft, crushing shell, end bearings and respective bearing housings to be removed from the equipment and transported to a place in which the replacement of the crushing surface and, eventually, of the bearings, can be adequately and safely carried out.

Taking into account that the assembly defined by each of the rollers and respective bearings and bearing housings represents a large weight, corresponding to a preponderant part of the weight of the equipment as a whole, the operations of dismounting, carrying and remounting the roller assemblies require special cares, which are complex, time-consuming and, consequently, expensive.

Further from the dismounting problems above mentioned, it should be noted that independent bearing housings for each roller allows one end of the shaft of each roller to move independently from the other end, which can result in non-axially aligned and in non-parallel bearings and in skewing of the two shafts, making the process harder to control.

SUMMARY OF THE INVENTION

As a function of the inconveniences of the known prior art solutions, it is an object of the present invention to provide a bearing arrangement for the rollers of a roller grinder or crusher of the type considered herein, which ensures an adequate structural rigidity and a predetermined relative positioning between the bearings of each roller, in order to avoid the loss of axial alignment of the bearings of each roller and also to minimize the loss of parallelism between the pair of rollers when they are relatively displaced to the desired operative position.

It is a further object of the present invention to provide a bearing arrangement as mentioned above and which also allows a simple and fast dismounting of each shaft of the roller in relation to the respective bearing housings carried by the structure of the equipment.

The bearing arrangement, object of the present invention, is applied to a roller crusher of the type which has a pair of crushing rollers, each roller including: a shaft having end portions mounted in respective rolling bearings, each being retained in the interior of a bearing housing mounted on a base structure of the crusher and a median hub portion.

According to a first aspect of the invention the bearing housings of each roller are affixed to a structural frame disposed externally to each roller, along one side of the respective roller.

According to another aspect of the invention, each bearing housing includes: a base portion, surrounding a portion of the circumferential contour of the rolling bearing, which is for example opposite to that turned to the other roller, and affixed to the respective structural frame; and a cover portion surrounding the remaining portion of the circumferential contour of the rolling bearing and removably attached to the base portion.

The construction proposed by the invention allows that the bearing housings, particularly the base portions of the latter, be rigidly connected to each other by the structural frame, forming a single structure which avoids the loss of axial alignment of the bearings of each roller and which minimizes the loss of parallelism between the pair of rollers when they are relatively displaced to the desired operative position.

Further, the split construction of the bearing housings allows the dismounting of the shaft to be carried out by simply and quickly removing the cover portions of the bearing housings.

BRIEF DESCRIPTION OF THE DRAWINGS

The invention will be described below, with reference to the enclosed drawings, given by way of example of an embodiment of the invention and in which.

DETAILED DESCRIPTION OF THE INVENTION

Figure 1:
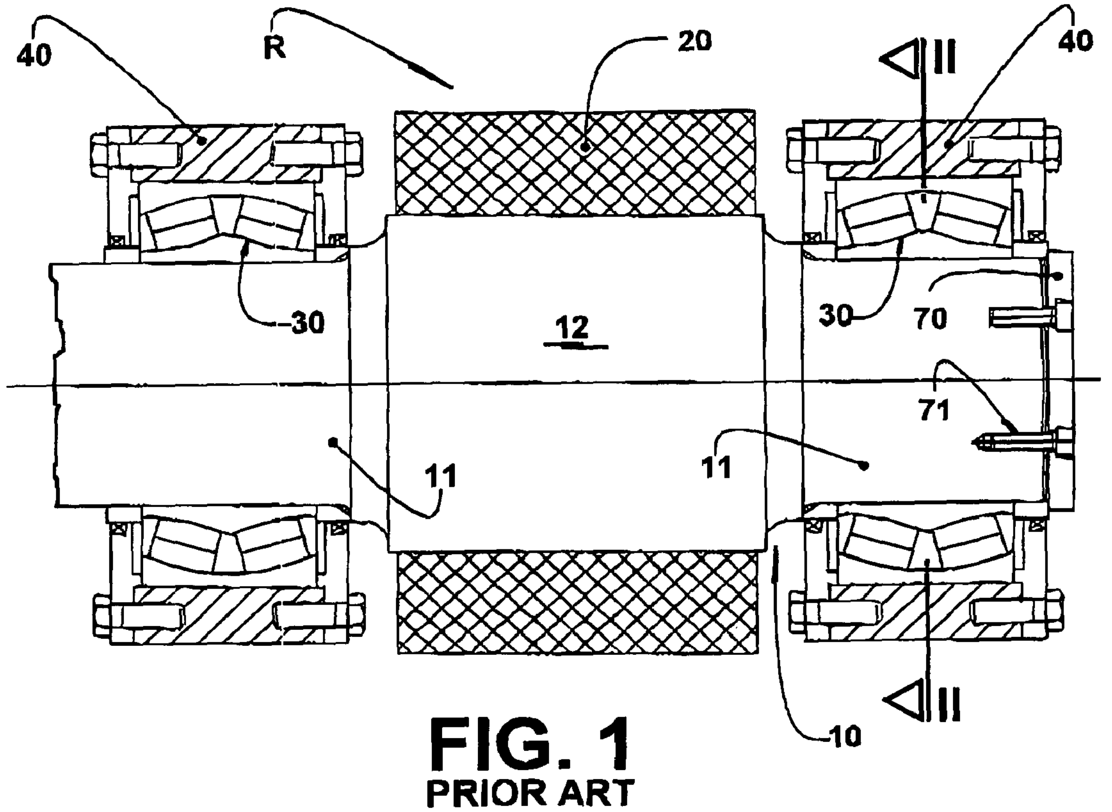
FIG. 1 PRIOR ART
FIG. 1 represents a longitudinal sectional view of a prior art crusher roller, having the end portions of its shaft mounted in rolling bearings contained in respective bearing housings that are structurally separated from one another and each defined in a single surrounding body.
Figure 2:
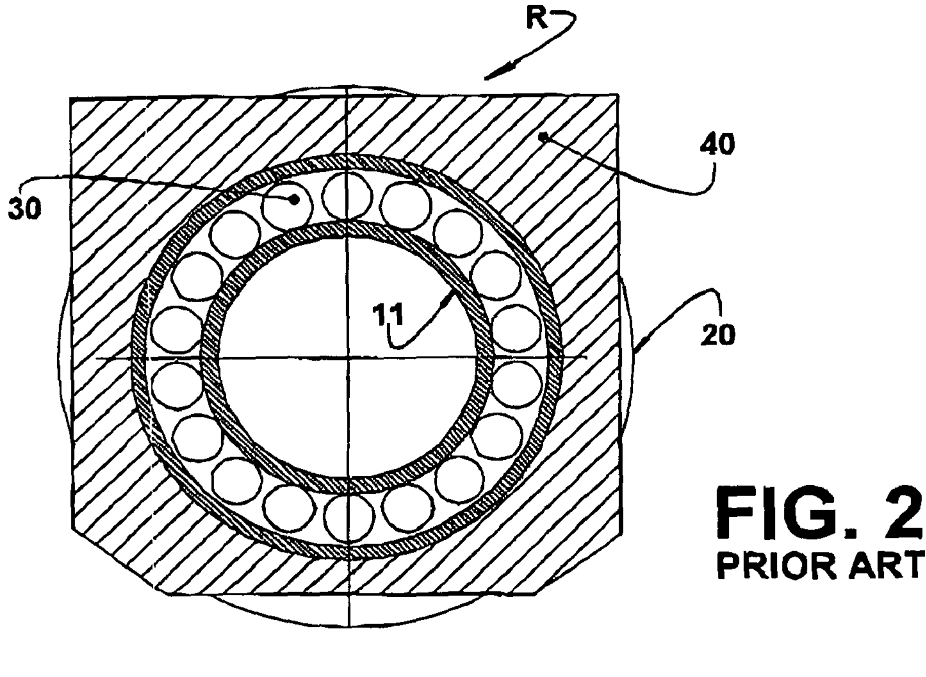
FIG. 2 PRIOR ART
FIG. 2 represents a cross sectional view of the roller of FIG. 1, taken according to line II-II in FIG. 1.

As illustrated in FIGS. 1 and 2, the rollers R of crushers of the type considered herein have a shaft 10, for example in metallic material adequate to the specific application and presenting end portions 11 and a median hub portion 12, around which is fixedly retained, generally by thermal contraction, a crushing shell 20 in the form of a tubular sleeve made in any adequate material, for example, a metallic alloy, resistant to forces to which the crushing shell 20 is subjected during the operation of the crusher of the type which has a pair of the parallel or nearly parallel crushing rollers R, rotated in opposite directions, around respective generally horizontal axes.

Each end portion 11 of the shaft 10 is mounted in the interior of a respective bearing 30, usually a rolling bearing, which is in turn fitted in the interior of a respective bearing housing 40 which is adequately and individually mounted in a base structure of the equipment, not illustrated in FIGS. 1 and 2.

As better illustrated in FIG. 2, each bearing housing 40 of the known constructions is formed in a single piece, defining a single structure surrounding the respective end portion 11 of the shaft 10 and which must be dismounted and released from the structure of the equipment at each operation of replacing the crushing surface of the crushing shell 20.

Figure 5:
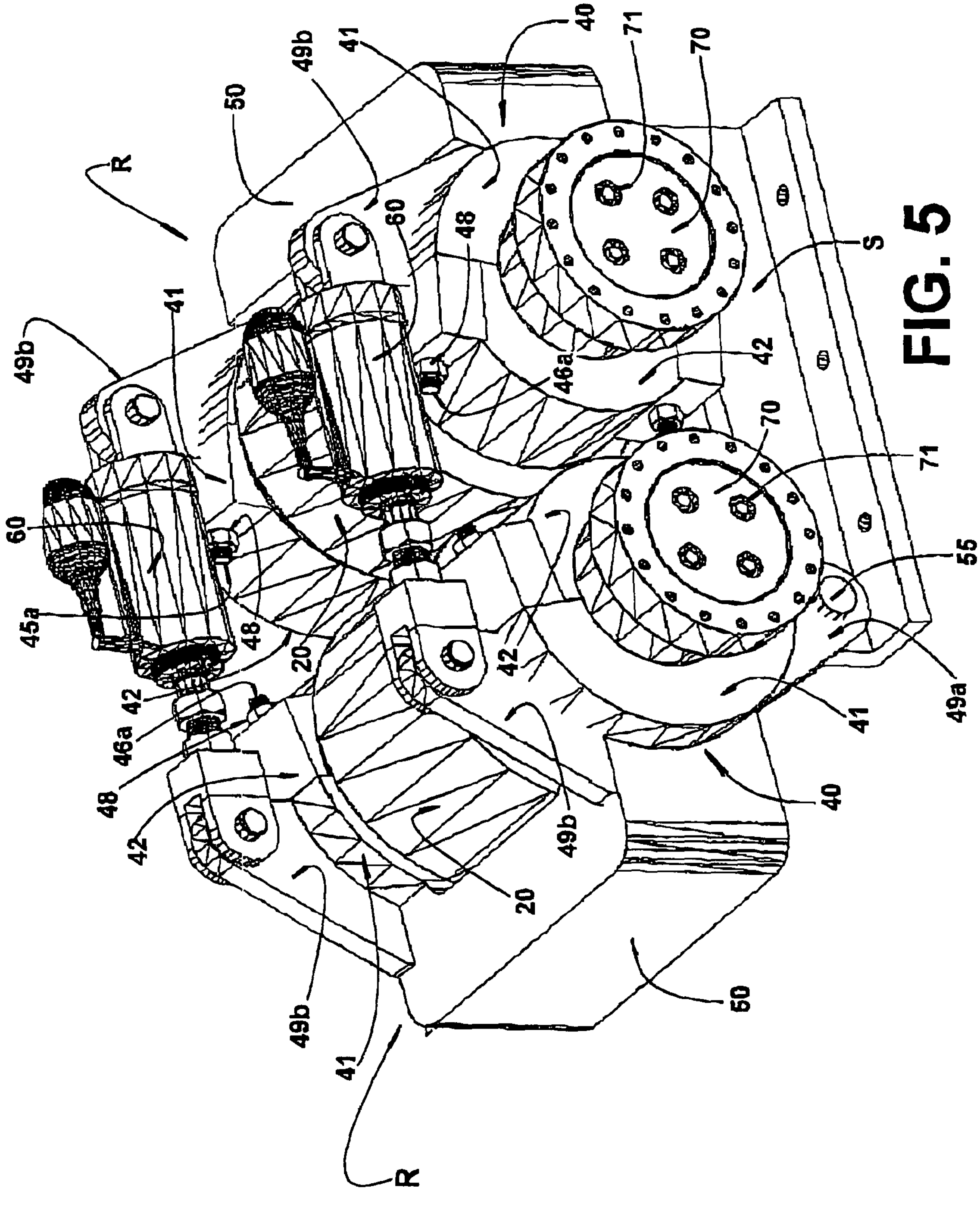
FIG. 5 represents a somewhat schematic perspective view of a pair of rollers in an operative position and provided with the bearing arrangement of the invention and mounted in a crusher structure, with the bearing housings of each roller being structurally connected to one another, in a single piece, by a structural frame, the structural frame of the pair of bearing housings of one of the rollers being inferiorly and horizontally articulated to the structure of the equipment, in order to be angularly displaceable in relation to the other roller that is fixed in relation to the base structure.
Figure 6:
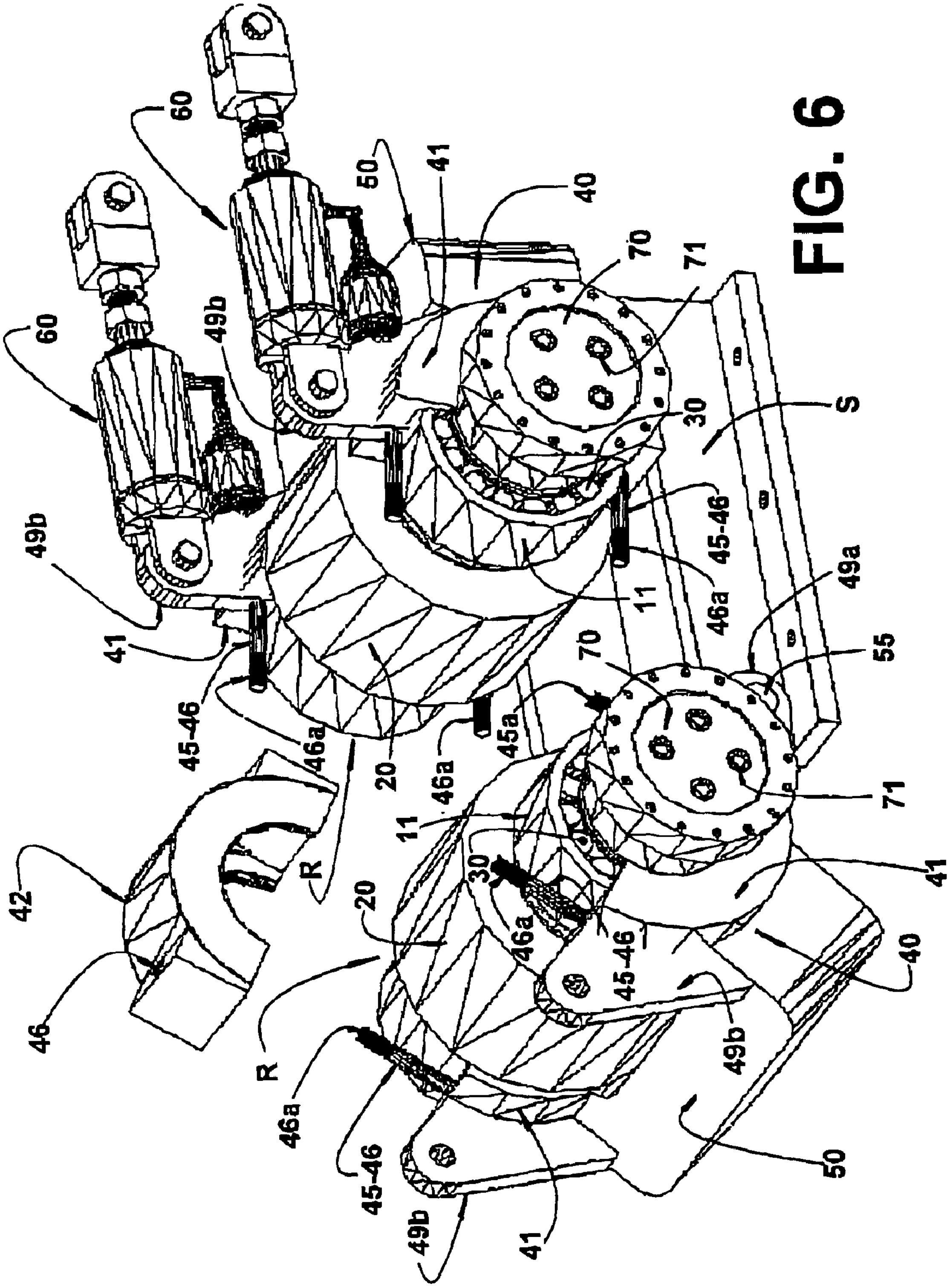
FIG. 6 represents a view similar to that of FIG. 5, but illustrating the pair of rollers in an inoperative position, with the bearing housings without the cover portions, only one of them being illustrated in an exploded position.

In a distinct way, as illustrated in FIGS. 5 and 6, the invention provides a bearing arrangement in which each bearing housing 40 of each roller R is affixed to a generally rigid structural frame 50 disposed externally to each roller R along one side of the respective roller R, opposed to that turned to the other roller R, the bearing housings 40 of each roller R being mounted to the base structure S of the crusher by means of the respective structural frame 50. It should be understood that the structural frame 50 does not need to be positioned along a side of the respective roller R opposite to that turned to the other roller R.

As illustrated in FIGS. 3-6, the invention preferably provides a bearing arrangement in which each bearing housing 40 comprises a base portion 41 constructed to surround a portion, usually half the circumferential contour of the respective rolling bearing 30, which is turned to a side opposite to that of the other roller R, this base portion 41 of each bearing housing 40 being fixedly attached to the base structure S of the crusher. Each bearing housing 40 also comprises a cover portion 42 that is dimensioned and configured to surround the remaining portion of the circumferential contour of the respective rolling bearing 30, the remaining portion being, in the illustrated construction, turned to the other roller R and removably attached to the base portion 41. In a preferred constructive form illustrated in FIGS. 5 and 6 the base portions 41 of said bearing housings 40 of each roller R are incorporated, in a single piece, to the structural frame 50 which is generally laid-U-shaped with each end of its side legs incorporating a respective bearing housing 40 and preferably the base portion 41 of said bearing housing 40. The structural frame 50 and the bearing housings 40 are generally constructed in steel, with resistance characteristics adequate to withstand the forces to which the assembly is subjected during operation of the equipment.

It should be understood herein that the bearing arrangement of the present invention can be applied to a shaft 10 constructed in a known manner and illustrated in the figures of the drawings, or to other shaft constructions, as long as they present end portions 11 mounted in rolling bearings 30 supported in bearing housings 40 carried by the structure S of the equipment defined by the crusher. Thus, the bearing arrangement should not be understood as being limited to a particular construction of the shaft 10 of each roller R.

In the illustrated embodiment, the fixation of the cover portion 42 to the respective base portion 41, in each bearing housing 40, is carried out by at least one retention means 45 to be attached to the base portion 41 or to the cover portion 42 and coupled to the other of the portions, and which is operated to permit that the cover portion 42 can be pressed and attached against the base portion 41. Each retention means 45 is generally formed by a pair of gripping elements, each actuating close to one of the ends of the circumferential contour of the base portion 41 and the cover portion 42.

Figure 4:
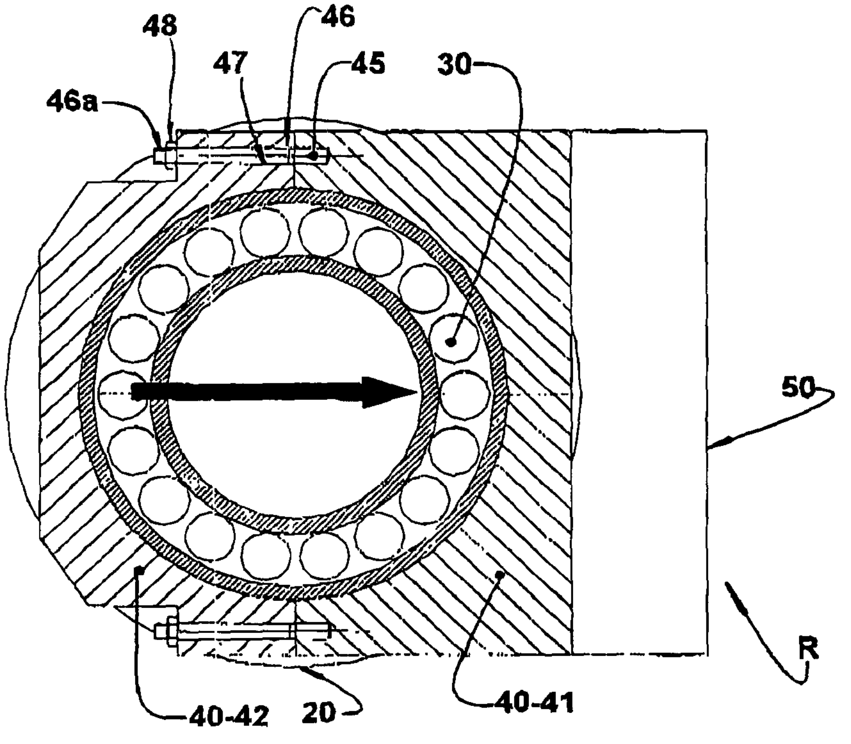
FIG. 4 represents a cross sectional view of the roller of FIG. 3, taken according to line IV-IV in FIG. 3.

In the illustrated construction, each retention means 45 comprises two studs 46, each being attached to the base portion 41 and projecting through a through hole 47 provided in the respective cover portion 42, stud 46 having a threaded free end **46*a* in which is fitted a gripping nut 48, as illustrated in FIGS. 4, 5 and 6. Although only one way of mounting each cover portion 42 to the respective base portion 41 of each bearing housing 40 has been illustrated herein, it should be understood that the mounting may be carried out in different ways whether known or unknown in the prior art such as by clamps or any other retention means, provided that the attachment of the cover portion 42 to the base portion 41 results in an adequate bearing housing 40 which can have its cover portion 42 easily and quickly dismounted by releasing the gripping elements which are exemplified herein by the studs 46 and gripping nuts 48**.

Independently of the structuring of the base portions 41 of the two pairs of bearing housings 40, the base portions 41 of a first roller R are rigidly and removably attached to the base structure S of the crusher, in order to maintain the respective roller R in a determined fixed position in relation to the base structure S. However, the base portions 41 of the bearing housings 40 of the other roller R are mounted to the base structure S so as to permit the respective roller R to be selectively displaced, in relation to the first roller R, between a spaced and inoperative position, as illustrated in FIG. 6, and operative positions defining a predetermined grinding gap between the two rollers R, as simplifiedly illustrated in FIG. 5.

The well-known construction mentioned above allows one of the rollers R to move in relation to the other roller R, permitting not only adjusting the crushing gap therebetween, but also displacing the moving roller to an inoperative position, generally well spaced from the other roller attached to the base structure S, to allow effecting maintenance in the rollers, the maintenance including, for example, removing the rollers from the equipment, in order to replace the crushing shells 20 and, eventually, the rolling bearings 30.

Preferably, the base portions 41 of the bearing housings 40 of the rollers R are mounted to the base structure S of the crusher, by means of the respective structural frames 50. In one possible construction, as illustrated in the drawings, one roller R is rigidly affixed to the base structure S, the respective structural frame 50 being attached to the base structure S in order to remain fixedly retained thereto, maintaining a determined positioning that is specific for the respective roller R, generally denominated fixed roller. On the other hand, the structural frame 50 of the other roller is mounted to the base structure S to allow displacing the respective roller, denominated moving roller, between its inoperative position, as illustrated in FIG. 6, and its operative positions, the positions defining a predetermined crushing gap between the pair of rollers R. FIG. 5 illustrates the pair of rollers R in a determined operative position. Although not illustrated, it is possible to have both rollers R movably mounted to the base structure S or fixedly mounted to the latter, in which case, the crushing gap is defined by other relative displacements of both rollers R.

In the embodiment illustrated in FIGS. 5 and 6, the structural frame 50 of one of the rollers R, denominated moving roller, is inferiorly and horizontally articulated to the base structure S, to allow the moving roller R to be angularly displaced between its inoperative position and its operative positions. As illustrated, this angular displacement of the moving roller R can be obtained, for example, through hinge pins 55, horizontally mounted through lower ears 49*a* of the bearing housings 40, which hinge pins 55 are journaled in the base structure S. It should be understood that the well known mounting is only exemplary, being replaceable by other articulation systems, provided that they allow the moving roller R to be angularly displaced to and from the other fixed roller R.

As further illustrated in FIGS. 5 and 6, the displacement of the rollers R for defining the crushing gap therebetween is usually carried out by hydraulic cylinders 60 which, in the case of the illustrated embodiment, are generally in the number of two and positioned superiorly to the rollers R, having an end articulated to a respective upper ear 49*b* incorporated to the base portion 41 of a respective bearing housing 40, and the opposite end articulated to a respective upper ear 49*b* incorporated to the base portion 41 of the confronting bearing housing 40 of the other roller R. The provision of the hydraulic cylinders 60 permits controlling the displacement of the moving roller R, for adjusting the crushing gap between the pair of rollers R. It should be understood that, when maintenance of the equipment is required, the hydraulic cylinders 60 can be disconnected from the moving roller R so as the latter can be displaced to its dismounting or maintenance inoperative position, as illustrated in FIG. 6. Utilizing hydraulic cylinders 60 to produce the angular displacement of the moving roller R is well known in the prior art, and there is no reason to detailedly describe specific characteristics of these moving means.

Figure 7:
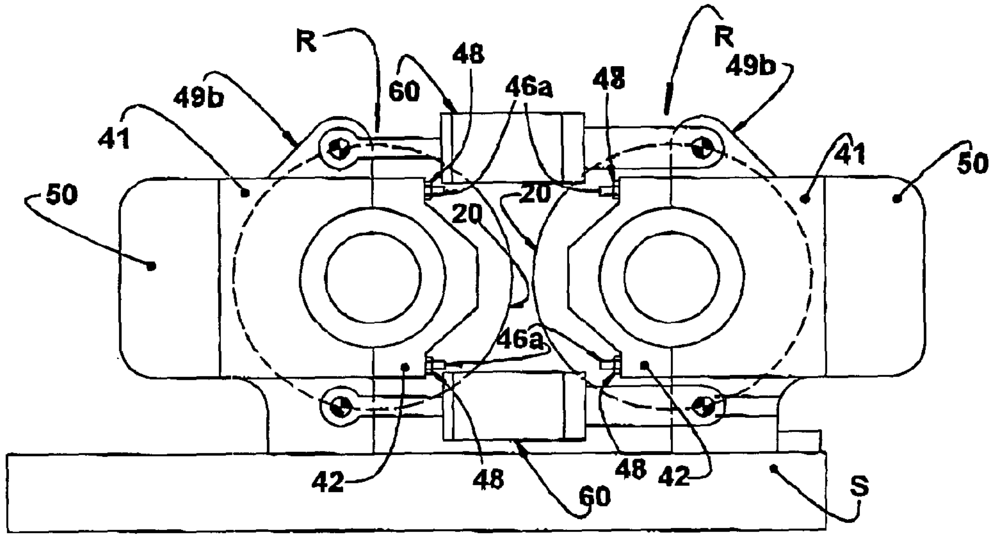
FIG. 7 represents a schematic side elevational view of a pair of rollers in an operative position and provided with the bearing arrangement of the invention and mounted in a crusher structure, with the bearing housings of each roller being structurally connected to one another, in a single piece, by a structural frame, the structural frame of the pair of bearing housings of one of the rollers being inferiorly and slidably mounted to the structure of the equipment, so as to be linearly displaceable in relation to the other roller that is fixed in relation to the base structure.
Figure 8:
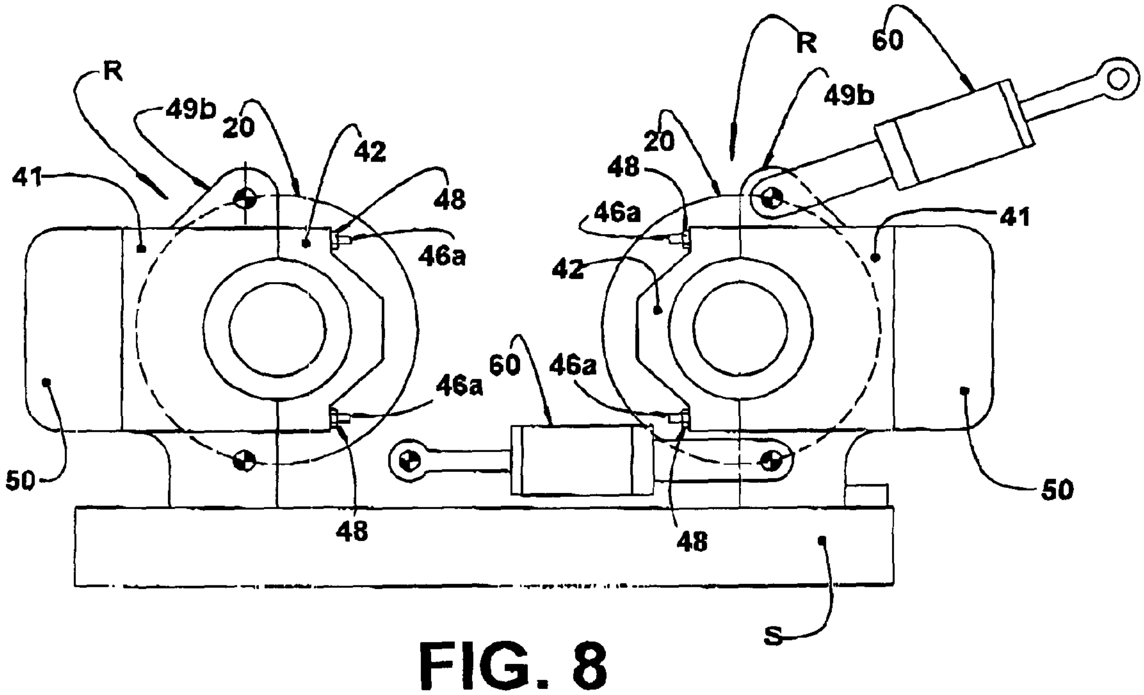
FIG. 8 represents a view similar to that of FIG. 7, but illustrating the pair of rollers in an inoperative position and the bearing housings with the cover portions in the mounted position.

As illustrated in FIGS. 7 and 8, it should be further considered the possibility of the moving roller R having its structural frame 50 inferiorly and slidably mounted on the base structure S, in a likewise known manner, so that the moving roller R can be linearly displaced, in a direction transversal to its axis, between its operative positions and inoperative position. In this case, there is generally provided two pairs of hydraulic cylinders 60, a pair positioned superiorly to the rollers R and the other pair disposed inferiorly to the pair of rollers R, the hydraulic cylinders 60 working together to produce the needed transversal linear displacement of the moving roller R.

Figure 3:
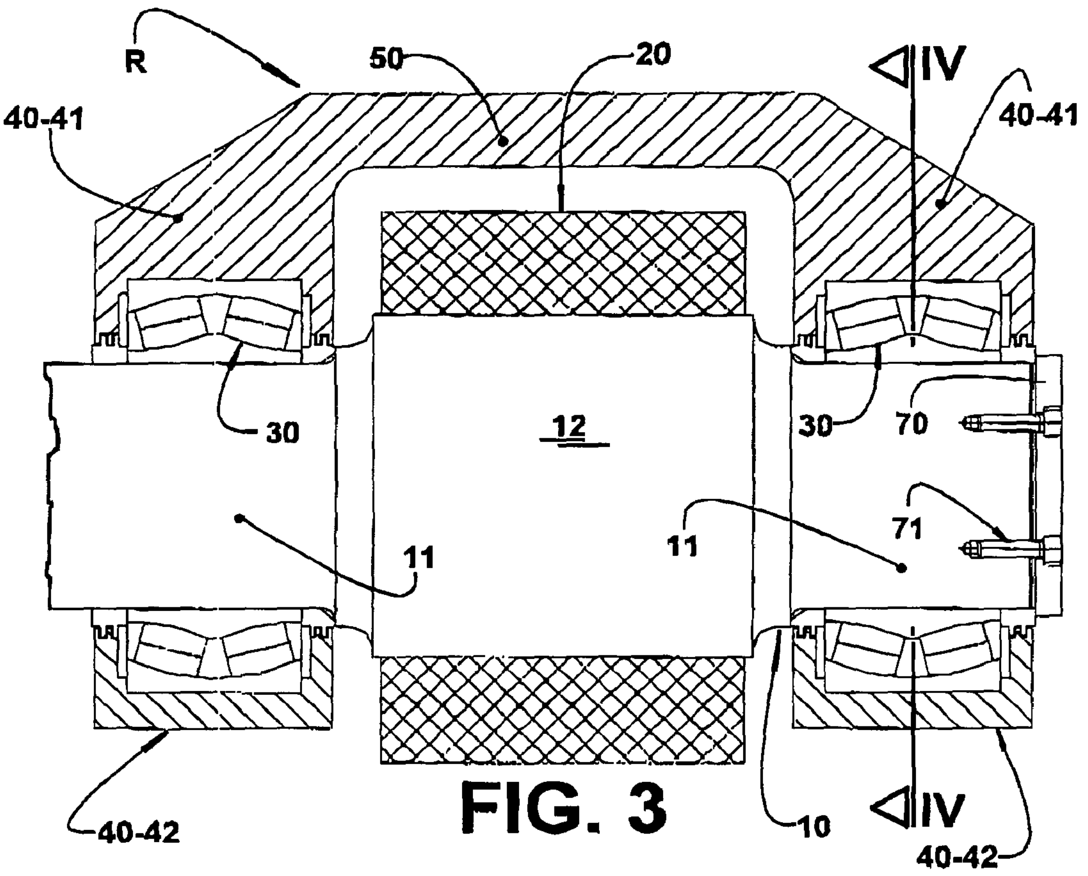
FIG. 3 represents a longitudinal sectional view of a crusher roller provided with the bearing arrangement object of the present invention, with the bearing housings being structurally connected to one another.

As further illustrated both in FIG. 1 and in FIGS. 3, 5 and 6, each roller R has its shaft 10 carrying, in one end, a plate 70 which can operate as an outer axial stop for the bearing M and which, in the illustrated embodiment, is attached to the adjacent end of the shaft 10 by a plurality of screws 71. The other end of the shaft 10 is constructed in any adequate manner to be coupled to a motor unit (not illustrated).

While only one possible constructive form for the bearing arrangement object of the present invention has been illustrated herein, it should be understood that alterations can be made in the form and physical arrangement of the different elements, without departing from the inventive concept defined in the claims accompanying the present specification.

The invention claimed is:

1. A bearing arrangement for a roller crusher for crushing, grinding, or pulverizing materials, the roller crusher comprising:

a pair of crushing rollers (R), generally parallel to one another and rotating in opposite directions, each roller (R) including a shaft which has end portions, mounted in respective rolling bearings, each being retained in the interior of a bearing housing mounted on a base structure (S) of the crusher, and a median hub portion, wherein the bearing housings of each roller (R) are affixed to a structural frame disposed externally to each roller (R), along one side of the respective roller (R), the bearing arrangement wherein each bearing housing includes: a base portion, surrounding a portion of the circumferential contour of the rolling bearing, and affixed to the respective structural frame; and a cover portion surrounding the remaining portion of the circumferential contour of the rolling bearing, and removably attached to the base portion.

2. The arrangement, as set forth in claim 1, wherein the bearing housings of each roller (R) are mounted to the base structure (S) of the crusher, by means of the respective structural frame.

3. The arrangement, as set forth in claim 1 wherein the bearing housings of at least one of the rollers (R) are mounted to the base structure (S) of the crusher so as to allow the respective roller (R) to be selectively displaced in relation to the other roller (R), between an inoperative spaced position and operative positions, defining a predetermined crushing gap between the two rollers (R).

4. The arrangement, as set forth in claim 3, wherein at the structural frame of at least one of the rollers (R) is inferiorly articulated to the base structure (S), in order to allow said roller (R) to be angularly displaced between its operative positions and inoperative position.

5. The arrangement, as set forth in claim 3, wherein the structural frame of at least one of the rollers (R) is inferiorly and slidably mounted on the base structure (S), in order to allow said roller (R) to be linearly displaced, in a direction transversal to its axis, between its operative positions and inoperative position.

6. The arrangement, as set forth in claim 1 wherein the base portion of each bearing housing surrounds a portion of the circumferential contour of the rolling bearing, opposite to that turned to the other roller (R).

7. The arrangement, as set forth in claim 1 wherein the base portions of the bearing housings of each roller (R) are incorporated, in a single piece, to the respective structural frame.

8. The arrangement, as set forth in claim 1 the fixation of the cover portion to the respective base portion, of each bearing housing, is made by at least one retention means to be attached to one of the parts of base portion and cover portion and coupled to the other of said parts, so as to allow the cover portion to be pressed and affixed against the base portion.

9. The arrangement, as set forth in claim 8, wherein the retention means comprises at least one stud attached to the base portion and projecting through a through hole of the cover portion and having a threaded free end in which is fitted a gripping nut.

* * * * *

UNITED STATES PATENT AND TRADEMARK OFFICE

CERTIFICATE OF CORRECTION

PATENT NO. : 8,297,847 B2
APPLICATION NO. : 13/001693
DATED : October 30, 2012
INVENTOR(S) : Andrzej Niklewski and Paulo Barscevicius It is certified that error appears in the above-identified patent and that said Letters Patent is hereby corrected as shown below:

In the Claims:

Claim 1, Column 6, lines 52-53, that portion of the claim reading “the bearing arrangement wherein each bearing housing includes....” In claim 1 (Column 6, lines 52-53) should read “wherein each bearing housing includes....” I.e., “the bearing arrangement” should be removed.

Signed and Sealed this
Twenty-fifth Day of June, 2013

Teresa Stanek Rea
*Acting Director of the United States Patent and Trademark Office*